(12) United States Patent
Suzuki et al.

(10) Patent No.: US 11,440,403 B2
(45) Date of Patent: Sep. 13, 2022

(54) CONTROL APPARATUS FOR ELECTRIC VEHICLE, CONTROL SYSTEM FOR ELECTRIC VEHICLE, AND CONTROL METHOD FOR ELECTRIC VEHICLE

(71) Applicant: Hitachi Automotive Systems, Ltd., Hitachinaka (JP)

(72) Inventors: Keisuke Suzuki, Kawasaki (JP); Satoshi Kaneko, Atsugi (JP); Kazuya Takahashi, Sagamihara (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 751 days.

(21) Appl. No.: 16/331,775

(22) PCT Filed: Aug. 15, 2017

(86) PCT No.: PCT/JP2017/029335
§ 371 (c)(1),
(2) Date: Mar. 8, 2019

(87) PCT Pub. No.: WO2018/051704
PCT Pub. Date: Mar. 22, 2018

(65) Prior Publication Data
US 2021/0379988 A1    Dec. 9, 2021

(30) Foreign Application Priority Data

Sep. 16, 2016  (JP) .............................. JP2016-181333

(51) Int. Cl.
*B60K 1/02* (2006.01)
*B60K 23/08* (2006.01)
(Continued)

(52) U.S. Cl.
CPC ............. *B60K 23/0808* (2013.01); *B60K 1/02* (2013.01); *B60K 17/356* (2013.01); *B60L 15/20* (2013.01);
(Continued)

(58) Field of Classification Search
None
See application file for complete search history.

(56) References Cited

U.S. PATENT DOCUMENTS 10,099,694 B2 * 10/2018 Takahashi ............... B60K 6/445
2013/0325238 A1   12/2013 Kato et al.
(Continued)

FOREIGN PATENT DOCUMENTS

JP     2006-246607 A    9/2006
WO    WO 2012/111124 A1  8/2012
(Continued)

OTHER PUBLICATIONS

International Search Report (PCT/ISA/210) issued in PCT Application No. PCT/JP2017/029335 dated Nov. 21, 2017 with English translation (five pages).
(Continued)

*Primary Examiner* — James M McPherson
(74) *Attorney, Agent, or Firm* — Crowell & Moring LLP

(57) ABSTRACT

Provided is a control apparatus for an electric vehicle that can set a final torque instruction value without necessitating a repetition of a calculation. A control apparatus calculates a power limit value of each motor that is used when power is supplied to a plurality of motors, based on a power limit value of a power source, and calculates a torque instruction value of each motor based on the power limit value of each motor.

15 Claims, 8 Drawing Sheets

(51) Int. Cl.
  *B60K 17/356* (2006.01)
  *B60L 15/20* (2006.01)
(52) U.S. Cl.
  CPC ... *B60K 2023/0816* (2013.01); *B60L 2240/12* (2013.01); *B60L 2240/423* (2013.01); *B60L 2240/465* (2013.01)

(56) References Cited

U.S. PATENT DOCUMENTS

2014/0081499 A1   3/2014   Ito et al.
2016/0144739 A1   5/2016   Ando et al.
2017/0282897 A1*  10/2017  Shimizu .......... B60W 30/18127

FOREIGN PATENT DOCUMENTS

| WO | WO 2012/114440 A1 | 8/2012 |
| WO | WO 2014/103522 A1 | 7/2014 |
| WO | WO 2015/099032 A1 | 7/2015 |

OTHER PUBLICATIONS

Japanese-language Written Opinion (PCT/ISA/237) issued in PCT Application No. PCT/JP2017/029335 dated Nov. 21, 2017 (four pages).

\* cited by examiner

CONTROL APPARATUS FOR ELECTRIC VEHICLE, CONTROL SYSTEM FOR ELECTRIC VEHICLE, AND CONTROL METHOD FOR ELECTRIC VEHICLE

TECHNICAL FIELD

The present invention relates to a control apparatus, a control system, and a control method for an electric vehicle.

BACKGROUND ART

Conventionally, PTL 1 has disclosed a control apparatus for an electric vehicle. This control apparatus gradually reduces a torque instruction value while reducing it by a predetermined amount if the torque instruction value based on a torque requested by a driver exceeds a value corresponding to a power limit on a battery when distributing the torque to a motor that outputs power to front wheels and a motor that outputs power to rear wheels. Then, the control apparatus repeatedly confirms whether the reduced torque instruction value falls within the values corresponding to the power limit on the battery, and sets a final torque instruction value.

CITATION LIST

Patent Literature

[PTL 1] Japanese Patent Application Public Disclosure No. 2006-246607

SUMMARY OF INVENTION

Technical Problem

However, the method that determines the final torque instruction value by gradually reducing the torque instruction value, like PTL 1, necessitates a repetition of the calculation until the final torque instruction value is obtained, thereby making the calculation processing cumbersome.

An object of the present invention is to provide a control apparatus for an electric vehicle that can set the final torque instruction value without necessitating the repetition of the calculation.

Solution to Problem

One aspect of the present invention calculates a power limit value of each motor that is used when power is supplied to a plurality of motors, based on a power limit value of a power source, and calculates a torque limit value of each motor based on the power limit value of each motor. Therefore, the torque instruction values of the plurality of motors can be calculated without the calculation repeated.

DESCRIPTION OF EMBODIMENTS

First Embodiment

Figure 1:
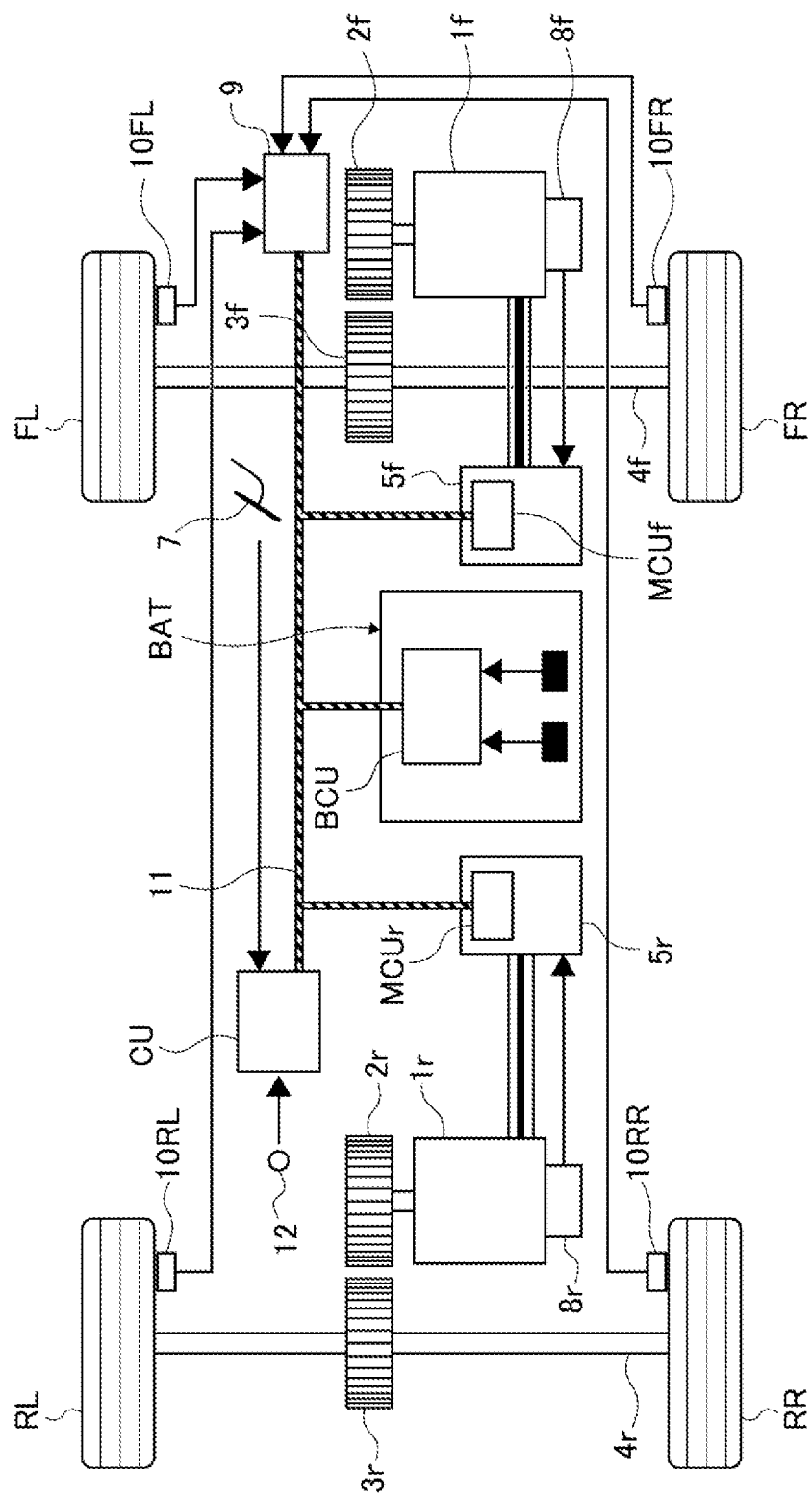
FIG. 1 is a system diagram of an electric vehicle according to a first embodiment.

FIG. 1 is a system diagram of an electric vehicle according to a first embodiment. An electric vehicle according to a first embodiment is a four-wheel drive vehicle, in which front wheels FL and RR are driven by a front motor $1f$ and rear wheels RL and RR are driven by a rear motor $1r$. A differential gear $3f$ is connected to the front motor $1f$ via a speed reduction mechanism $2f$. A drive shaft $4f$ is connected to the differential gear $3f$. The front wheels FL and FR are connected to the drive shaft $4f$. An inverter $5f$ includes a motor control unit MCUf, which controls the front motor $1f$. Similarly, a differential gear $3r$ is connected to the rear motor $1r$ via a speed reduction mechanism $2r$. A drive shaft $4r$ is connected to the differential gear $3r$. The rear wheels RL and RR are connected to the drive shaft $4r$. An inverter $5r$ includes a motor control unit MCUr, which controls the rear motor $1r$.

A high-voltage battery BAT includes a battery control unit BCU, which controls supply power. The high-voltage battery BAT is a battery module formed by connecting a plurality of batteries, and the battery control unit BCU controls power to be supplied from one battery module to a plurality of motors (the front motor $1f$ and the rear motor $1r$).

The electric vehicle includes an accelerator position sensor 7, resolvers $8f$ and $8r$, and a longitudinal acceleration sensor 12. The accelerator position sensor 7 outputs an accelerator position signal. The resolvers $8f$ and $8r$ each output a motor rotational speed signal including a rotational direction of the electric motor 1. The longitudinal acceleration sensor 12 detects a longitudinal acceleration sg of the vehicle. A vehicle control unit CU receives a range position signal from a shift lever and the accelerator position signal from the accelerator position sensor 7. Further, the vehicle control unit CU receives the motor rotational speed signals from the resolvers $8f$ and $8r$ via the motor control units MCUf and MCUr, respectively. The vehicle control unit CU calculates a driving torque instruction value directed to the electric motor 1 based on the accelerator position and the like, and drives the front motor $1f$ and the rear motor $1r$ according to the driving torque instruction value.

A brake controller 9 is connected to wheel speed sensors 10FL, 10FR, 10RL, and 10RR (hereinafter also referred to as simply 10) mounted on the individual wheels, and receives a rotational speed signal of each of the wheels. The wheel speed sensors 10 each detect a wheel speed from a cycle of an electromagnetic pulse. The brake controller 9 adjusts brake fluid to be supplied to a brake unit of each of the wheels to control a braking torque of each of the wheels based on a brake operation amount input by a driver.

Information communication between the motor control units MCUf and MCUr, the vehicle control unit CU, and the brake controller 9 is carried out via a CAN communication line 11.

Figure 2:
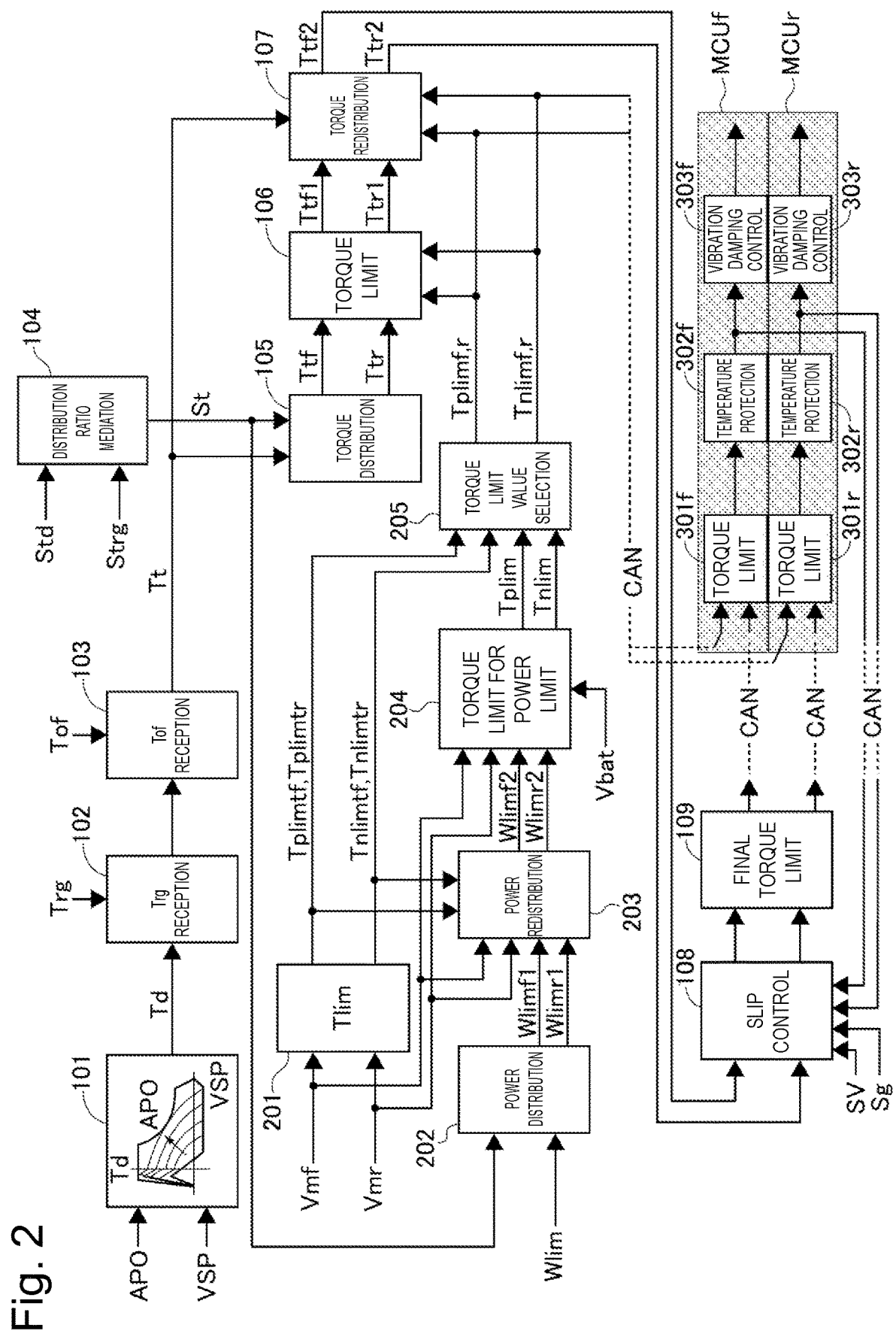
FIG. 2 is a control block diagram of the electric vehicle according to the first embodiment.

FIG. 2 is a control block diagram of the electric vehicle according to the first embodiment.

A driver requested torque calculation portion 101 calculates a torque Td requested by the driver based on an accelerator position APO and a vehicle speed VSP. The driver requested torque Td is set to a larger value as the accelerator position APO increases.

A regenerative torque reception portion 102 receives a requested regenerative torque Trg based on a requested braking torque calculated by another calculation portion, and corrects the driver requested torque Td.

A requested torque reception portion 103 receives a requested driving torque Tof calculated by another calculation portion, and corrects the driver requested torque Td. A total axle torque instruction value of the front motor 1f and the rear motor 1r acquired from the respective instruction values of the driver requested torque calculation portion 101, the regenerative torque reception portion 102, and the requested torque reception portion 103 is output as the requested torque Tt of the vehicle.

A distribution ratio mediation portion 104 determines a distribution ratio St that is used when the requested torque Tt is distributed to the front motor 1f and the rear motor 1r, based on a driving force distribution ratio instruction Std and a regenerative braking force distribution ratio instruction Strg. The driving force distribution ratio instruction is an instruction that a not-illustrated driving force distribution ratio calculation portion outputs by calculating a driving force distribution ratio between the front wheels and the rear wheels according to a running state. The regenerative braking force distribution ratio instruction is an instruction that a not-illustrated regenerative braking force distribution ratio calculation portion outputs by calculating a regenerative braking force distribution ratio between the front wheels and the rear wheels. The distribution ratio mediation portion 104 determines the distribution ratio St based on each of these distribution ratios and the current running state.

A torque distribution portion 105 calculates a reference front motor torque instruction value Ttf and a reference rear motor torque instruction value Ttr based on the requested torque Tt and the distribution ratio St. A torque limit portion 106 calculates a first front motor torque instruction value Ttf1 and a first rear motor torque instruction value Ttr1 (hereinafter, these instruction values will be referred to as first torque instruction values Tt1) limited based on positive torque limit values Tplimf and Tplimr and negative torque limit values Tnlimf and Tnlimr (hereinafter, these limit values will be referred to as torque limit values Tlim) selected by a torque limit value selection portion 205, which will be described below. In other words, the reference motor toque instruction values are corrected so as to fall within a range defined by the torque limit values Tlim.

A torque redistribution portion 107 calculates a second front motor torque instruction value Ttf2 and a second rear motor torque instruction value Ttr2 (hereinafter, these instruction values will be referred to as second torque instruction values Tt2) resulting from redistributing the torque to a motor corresponding to the first torque instruction value Tt1 smaller than the torque limit value Tlim within such a range that a sum of the first torque instruction values Tt1 of the individual motors does not exceed the requested torque Tt when the sum of the first torque instruction values Tt1 of the individual motors falls below the requested torque Tt.

A slip control portion 108 determines whether a slip has occurred on a wheel based on a wheel speed sv, the longitudinal acceleration sg, and limit values of temperature protection portions 302f and 302r, which will be described below, and calculates a torque limit amount directed to a motor torque connected to the wheel where the slip has occurred when there is the slip (including both a driving slip and a braking slip). A final torque limit portion 109 outputs, to each of the motors 1f and 1r, a final torque instruction value Tt3 determined based on the torque limit amount calculated by the slip control portion 108 that is applied to the second torque instruction value Tt2.

A maximum torque limit value calculation portion 201 calculates positive torque limit values Tplimtf and Tplimtr and negative torque limit values Tnlimtf and Tnlimtr (hereinafter, Tplimtf, Tplimtr, Tnlimtf, and Tnlimtr will also be referred to as maximum torque limit values Tlimax) of the individual motors, based on a rotational speed Vmf of the front motor 1f and a rotational speed Vmr of the rear motor 1r. A torque characteristic with respect to the number of rotations of the motor is predetermined, and these limit values are determined by setting a maximum outputtable torque value with respect to some rotational speed based on a map or the like.

A power distribution portion 202 calculates a first power limit value Wlimf1 of the front motor 1f and a first power limit value Wlimr1 of the rear motor 1r (hereinafter, Wlimf1 and Wlimr1 will also be referred to as first power limit values Wlim1) based on a battery power limit value Wlim, which is an upper limit value of power supplied from the high-voltage battery BAT, and the distribution ratio St. More specifically, when power is supplied from the single high-voltage battery BAT to the plurality of motors, determining power consumption of each of the motors individually may cause total power consumption to exceed the battery power limit value Wlim. Further, it is also conceivable to correct the torque of each of the motors so as to prevent the power consumption from exceeding the battery power limit value Wlim after individually determining the power consumption of each of the motors, but this method necessitates a repetition of the calculation. On the other hand, in the first embodiment, the electric vehicle can effectively control each motor torque without exceeding the battery power limit value Wlim, by distributing the power in advance and setting the first power limit value Wlim1 of each of the motors based on this power distribution.

A power redistribution portion 203 calculates a second power limit value Wlimf2 of the front motor 1f and a second power limit value Wlimr2 of the rear motor 1r (hereinafter, Wlimf2 and Wlimr2 will also be referred to as second power limit values Wlim2) resulting from distributing extra power after subtracting actual power consumption Wx (x=f and r) from the first power limit value Wlim1 of some motor of the individual motors to the power limit value Wlim1 of another motor.

Figure 3:
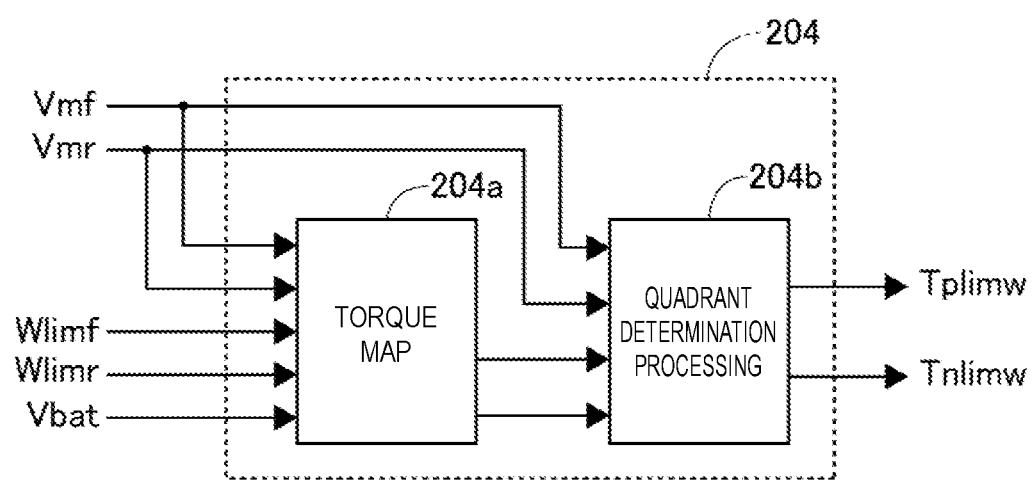
FIG. 3 is a control block diagram illustrating a configuration of a first torque limit value calculation portion according to the first embodiment.

A first torque limit value calculation portion 204 calculates a positive torque limit value Tplimw and a negative torque limit value Tnlimw (hereinafter, Tplimw and Tnlimw will also be referred to as first torque limit values Tlimw) according to a battery potential Vbat of the high-voltage battery BAT, the rotational speeds Vmf and Vmr, and the second power limit values Wlim2. FIG. 3 is a control block diagram illustrating a configuration of the first torque limit value calculation portion according to the first embodiment. The first torque limit value calculation portion 204 includes a torque map 204a and a quadrant determination processing portion 204b. A relationship between the rotational speed and a maximum torque of each of the motors corresponding to the power limit value Wlim1 is set in the torque map 204a. Based thereon, the first torque limit value Tlimw is calculated. Further, when the battery potential Vbat is low, the battery power limit value Wlim is corrected into a relatively small value. Then, the quadrant determination processing portion 204b determines a quadrant that the first torque limit value Tlimw belongs to, based on a direction in which the motor rotates, and calculates the positive torque limit value Tplimw and the negative torque limit value Tnlimw.

A torque limit value selection portion 205 selects a lower limit value of the maximum torque limit value Tlimmax and the first torque limit value Tlimw, and outputs it as the torque limit value Tlim.

The motor control units MCUf and MCUr include torque limit portions 301f and 301r, the temperature protection portions 302f and 302r, and vibration damping control portions 303f and 303r, respectively. The torque limit portions 301f and 301r each calculate a motor torque instruction value based on the final torque instruction value Tt3 output from the final torque limit portion 109 and the torque limit value Tlim output from the torque limit value selection portion 205. The temperature protection portions 302f and 302r each calculate a heat generation amount based on a value of a current supplied to the motor, and limit the motor torque instruction value in such a manner that the heat generation amount matches or falls below a predetermined heat generation amount. The vibration damping control portions 303f and 303r each calculate a vibration damping torque for damping a vibration generated on the drive shaft 4f or 4r, add the vibration damping torque to the motor torque instruction value, and finally performs the motor torque control.

Figure 4:
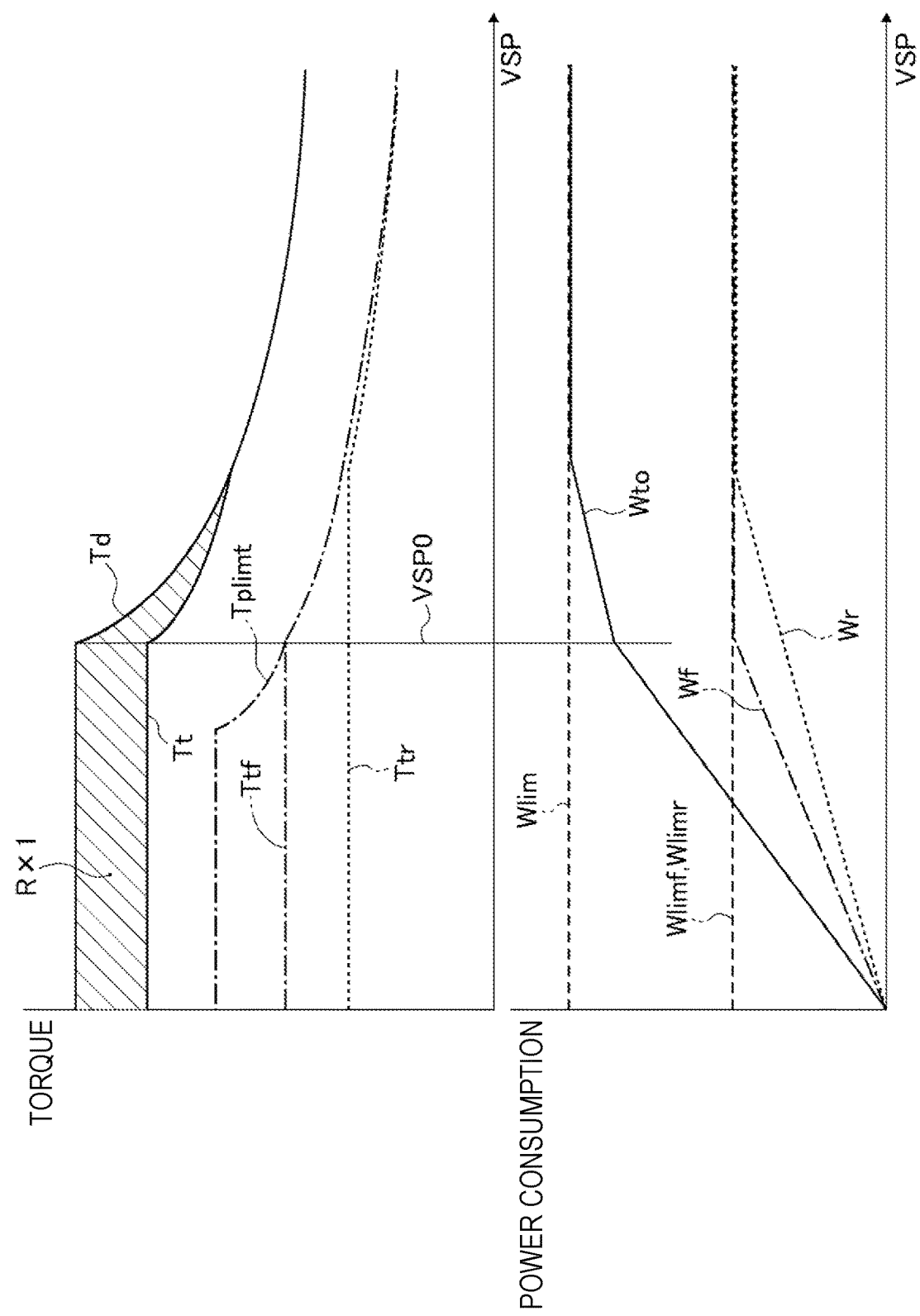
FIG. 4 is a characteristic diagram when torque redistribution and power redistribution are not carried out as a comparison example.

Next, functions will be described. FIG. 4 is a characteristic diagram when torque redistribution and power redistribution are not carried out as a comparison example. In this diagram, a horizontal axis is set to the vehicle speed VSP and a vertical axis is set to the torque and the power consumption. This diagram illustrates a case in which the positive torque is requested to both the front motor 1f and the rear motor 1r; the distribution ratio St, a ratio of the maximum torque limit values (Tplimtf:Tplimtr), and a ratio of the first power limit values (Wlimf1:Wlimr1) are set to 1:1, 2:1, and 1:1, respectively; and the driver requests a maximum acceleration. When the requested torque Td corresponds to 100%, 50% is set to each of the front motor 1f and the rear motor 1r as the reference front motor torque instruction value Ttf and the reference rear motor torque instruction value Ttr. However, because the first rear motor torque instruction value Ttr1 is limited to approximately 33% according to the maximum torque limit value of the rear motor 1r, only approximately 83% of the requested torque Td can be output even when 50% that is the first front motor torque instruction value Ttf1 is added. Further, when the power consumption Wf of the front motor 1f reaches the first power limit value Wlimf with the vehicle speed VSP at VSP0, the torque instruction value should reduce along with an increase in the vehicle speed VSP. Therefore, an actual torque that can be actually generated for the requested torque Td falls short by a torque corresponding to a shaded region Rx1 illustrated in FIG. 4, and cannot satisfy the requested torque.

Figure 5:
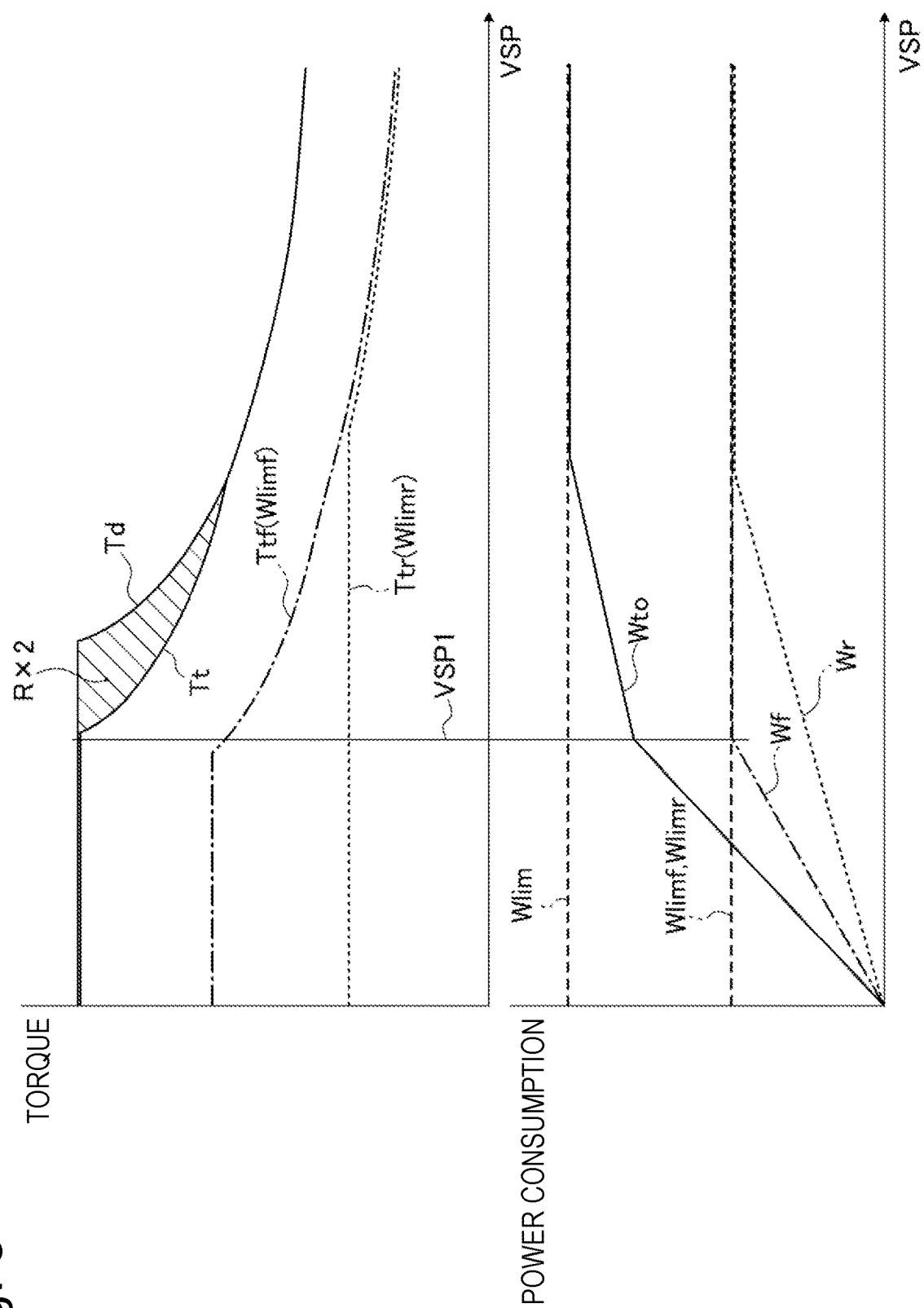
FIG. 5 is a characteristic diagram when only the torque redistribution is carried out and the power redistribution is not carried out as a comparison example.

FIG. 5 is a characteristic diagram when only the torque redistribution is carried out and the power redistribution is not carried out as a comparison example. This diagram illustrates characteristic case in which the positive torque is requested to both the front motor 1f and the rear motor 1r; the distribution ratio St, the ratio of the maximum torque limit values (Tplimtf:Tplimtr), and the ratio of the first power limit values (Wlimf1:Wlimr1) are set to 1:1, 2:1, and 1:1, respectively; and the driver requests a maximum acceleration. When the requested torque Td corresponds to 100%, 50% is set to each of the front motor 1f and the rear motor 1r as the reference front motor torque instruction value Ttf and the reference rear motor torque instruction value Ttr. However, because the first rear motor torque instruction value Ttr1 is limited to approximately 33% according to the maximum torque limit value of the rear motor 1r, only approximately 83% of the requested torque Td can be output even when 50% that is the first front motor torque instruction value Ttf1 is added.

Now, the maximum torque limit value Tplimtf of the front motor 1f is approximately 66%, and therefore the front motor 1f affords to an increase in the torque output. Therefore, the torque is redistributed to increase the front motor torque instruction value Ttf1 to approximately 66%, which is the maximum torque limit value Tplimtf, to compensate for approximately 17%, which is the difference between the requested torque Td and (the first front motor torque instruction value Ttf1+the first rear motor torque instruction value Ttr1). As a result, although the distribution ratio is changed from the originally set distribution ratio St, the requested torque Td can be satisfied.

However, when the power consumption Wf of the front motor 1f reaches the first power limit value Wlimf with the vehicle speed VSP at VSP1, the torque instruction value should reduce along with an increase in the vehicle speed VSP. Because a gradient of the power consumption increases as the torque instruction value increases, the power consumption Wf reaches the first power limit value Wlimf further earlier, so that the actual torque falls short by a torque corresponding to a shaded region Rx2 illustrated in FIG. 5 and cannot satisfy the requested torque.

Figure 6:
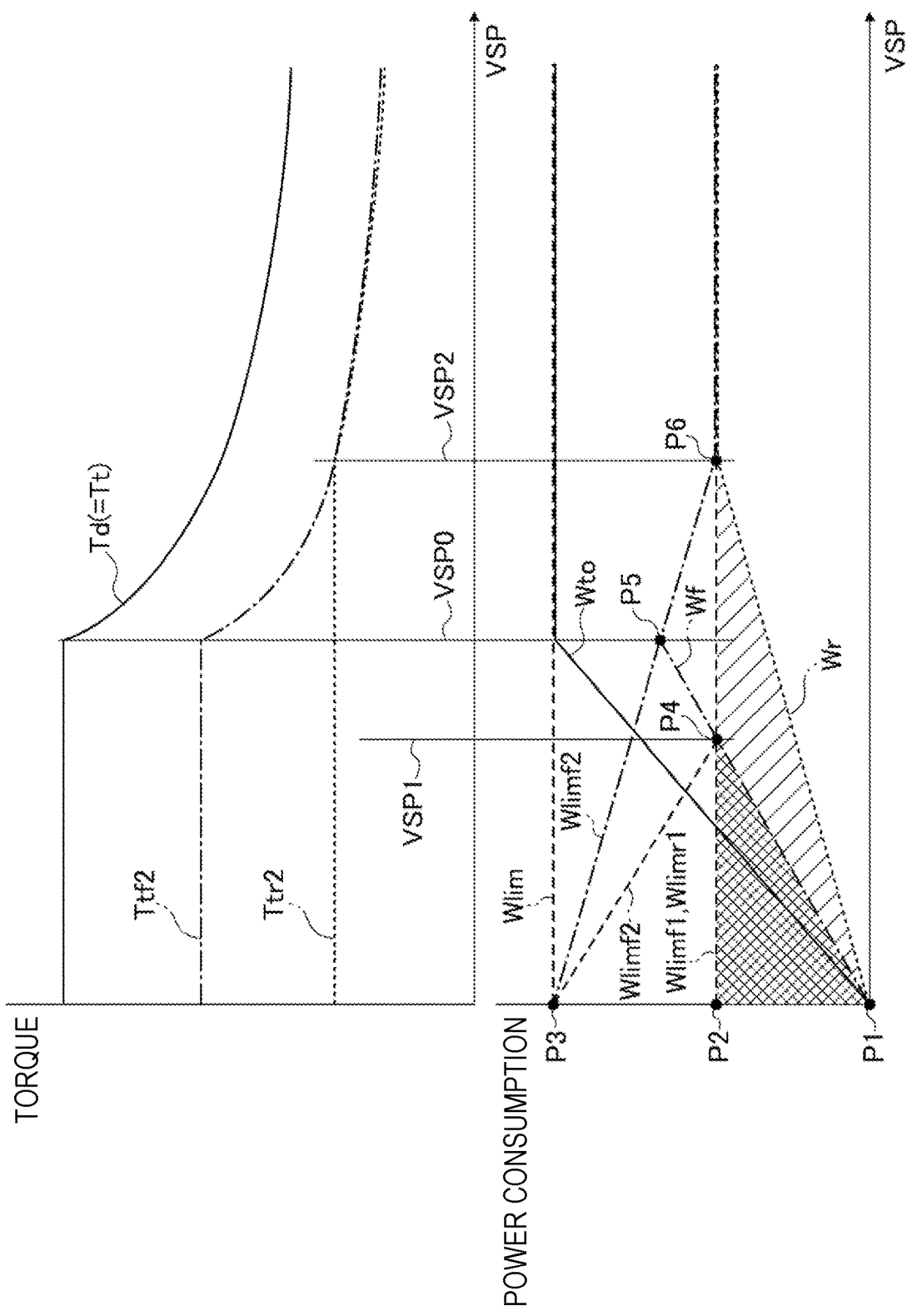
FIG. 6 is a characteristic diagram when the torque redistribution and the power redistribution according to the first embodiment are carried out.

FIG. 6 is a characteristic diagram when the torque redistribution and the power redistribution according to the first embodiment are carried out. This diagram illustrates a case in which the positive torque is requested to both the front motor 1f and the rear motor 1r; the distribution ratio St, the ratio of the maximum torque limit values (Tplimtf:Tplimtr), and the ratio of the first power limit values (Wlimf1:Wlimr1) are set to 1:1, 2:1, and 1:1, respectively; and the driver requests a maximum acceleration. When the requested torque Td corresponds to 100%, 50% is set to each of the front motor 1f and the rear motor 1r as the reference front motor torque instruction value Ttf and the reference rear motor torque instruction value Ttr. However, because the first rear motor torque instruction value Ttr1 is limited to approximately 33% (=100%×⅓) according to the maximum torque limit value of the rear motor 1r, only approximately 83% (=100%×⅚) of the requested torque Td can be output even when 50% that is the first front motor torque instruction value Ttf1 is added.

Now, the maximum torque limit value Tplimtf of the front motor 1f is approximately 66% (=100%×⅔), and therefore the front motor 1f affords to an increase in the torque output. Therefore, the torque is redistributed to increase the front motor torque instruction value Ttf1 to approximately 66% (=100%×⅔), which is the maximum torque limit value Tplimtf, to compensate for approximately 17% (=100%×⅙), which is the difference between the requested torque Td and (the first front motor torque instruction value Ttf1+the first rear motor torque instruction value Ttr1). As a result, although the distribution ratio is changed from the originally set distribution ratio St, the requested torque Td can be satisfied.

Then, when the torque instruction value of each of the motors is determined, the gradient of each of the power consumption Wf and Wr is determined. Therefore, focusing on the power consumption Wr of the rear motor $1r$, P1, P2, P3, P4, and P6 are defined to be an origin (VSP, Wr)=(0, 0), (VSP, Wr)=(0, Wlimr1), (VSP, Wr)=(0, Wlim), (VSP, Wr)= (VSP1, Wlimf1), and (VSP, Wr)=(VSP2, Wlimr1), respectively. There is room between the power consumption Wr of the rear motor $1r$ and the first power limit value Wlimr1 until the vehicle speed VSP reaches the vehicle speed VSP2. The electric motor according to the first embodiment determines the power distribution to follow when supplying power from the single battery module to the two motors. Therefore, if it is apparent that one of the motors consumes only power lower than the power distributed thereto, the extra distributed power can be redistributed as the power of the other motor.

Therefore, in the first embodiment, the electric vehicle is configured to handle a rectangular region surrounded by P1, P2, and P6 as extra power of the rear motor $1r$, and add it to the power distributed to the front motor $1f$, thereby increasing the first power limit value Wlimf1 of the front motor $1f$ to the second power limit value Wlimf2. As a result, the electric vehicle can increase the range of the second power limit value Wlimf2 of the front motor $1f$ by the area defined by P2, P3, and P6, by adding the area defined by P1, P2, and P6 to Wlimf1. The same also applies to when the focus shifts to the front motor $1f$, and the electric vehicle can increase the corresponding range by an area defined by P2, P3, and P4, by adding the area defined by P1, P2, and P4 to Wlimr1.

Therefore, even if the vehicle speed VSP reaches VSP1 and the power consumption Wf of the front motor $1f$ reaches the first power limit value Wlimf1, the electric vehicle can continue the output of the motor torque without being subjected to the limitation. Then, when Wf reaches the second power limit value Wlimf2 at P5, thereafter the power consumption is limited to the second power limit value Wlimf2. Therefore, the electric vehicle can satisfy the requested torque Td in all vehicle speed ranges.

Figure 7:
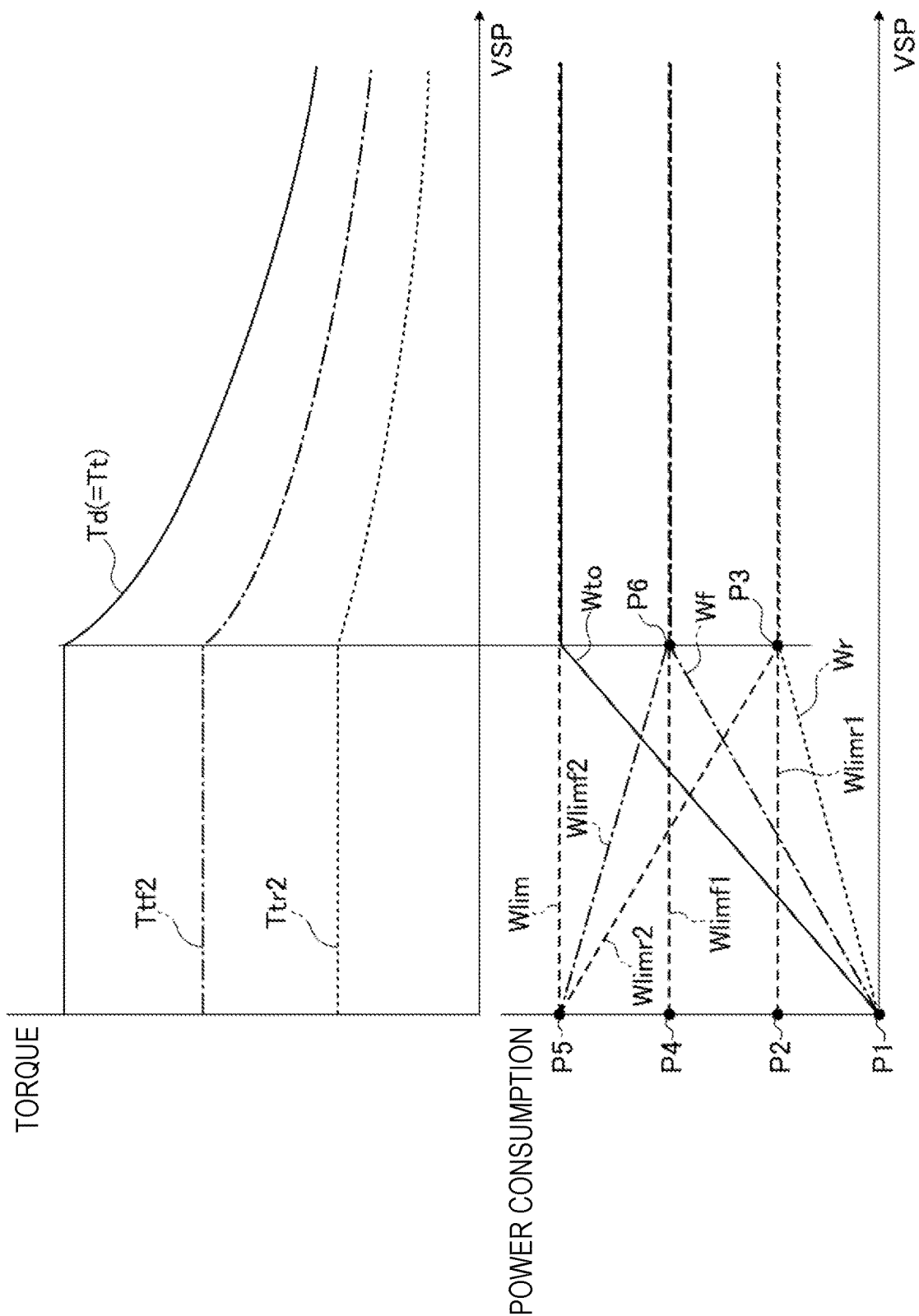
FIG. 7 is a characteristic diagram when the torque redistribution and the power redistribution according to the first embodiment are carried out.

FIG. 7 is a characteristic diagram when the torque redistribution and the power redistribution according to the first embodiment are carried out. This diagram illustrates a case in which the positive torque is requested to both the front motor $1f$ and the rear motor $1r$; the distribution ratio St, the ratio of the maximum torque limit values (Tplimtf:Tplimtr), and the ratio of the first power limit values (Wlimf1: Wlimr1) are set to 1:1, 2:1, and 2:1, respectively; and the driver requests a maximum acceleration. In this case, the electric vehicle also handles the rectangular region surrounded by P1, P2, and P3 as the extra power of the rear motor $1r$, and adds it to the power distributed to the front motor $1f$. As a result, the electric vehicle can increase the range of the second power limit value Wlimf2 of the front motor $1f$ by an area defined by P4, P5, and P6. Similarly, the same also applies to when the focus shifts to the front motor $1f$, and the electric vehicle can increase the second power limit value Wlimr2 of the rear motor $1r$ by an area defined by P1, P5, and P6, by adding the area defined by P1, P4, and P6 to Wlimr1.

In the above-described manner, the first embodiment brings about the following advantageous effects.

(1) The control apparatus for the electric vehicle includes the front motor $1f$ and the rear motor $1r$ (a plurality of motors) configured to receive the supply of the power from the high-voltage battery BAT (a power source) and provide a torque to each of the axles of the vehicle. The control apparatus for the electric vehicle includes the power distribution portion 202 (a first power limit value calculation portion) configured to calculate the power limit value Wlimf1 and Wlimr1 of each of the motors that is used when the power is supplied to the front motor $1f$ and the rear motor $1r$, based on the power limit value Wlim of the high-voltage battery BAT, and the first torque limit value calculation portion 204 configured to calculate the first torque limit value Tlimw, which is the torque limit value of each of the motors, based on the power limit value Wlimf1 and Wlimr1 of each of the motors. Therefore, the control apparatus for the electric vehicle can calculate the final torque instruction values of the plurality of motors without repeating the calculation.

(2) The control apparatus for the electric vehicle further includes the requested torque calculation portion 101 configured to calculate the requested torque Td of the vehicle, the requested torque distribution ratio calculation portion 104 configured to calculate the distribution ratio St at which the requested torque Td is distributed to each of the axles, the torque limit portion 106 (a first torque instruction value calculation portion) configured to calculate the first torque instruction value Tt1 of each of the motors that is equal to or smaller than the first torque limit value Tlimw and satisfies the distribution ratio St, and the torque redistribution portion 107 (a second torque instruction value calculation portion) configured to calculate the second torque instruction value Tt2 resulting from redistributing, within the range that allows the sum of the first torque instruction values Tt1 of the individual motors does not exceed the requested torque Td, the torque to the motor corresponding to the first torque instruction value Tt1 lower than the first torque limit value Tlimw, when the sum of the first torque instruction values Tt1 of the individual motors is smaller than the requested torque Td.

Therefore, the control apparatus for the electric vehicle can output the torque according to the requested torque by redistributing the torque limited according to the distribution ratio St.

(3) The control apparatus for the electric vehicle further includes the power redistribution portion 203 (a second power limit value calculation portion) configured to calculate the second power limit value Wlim2 (a second power limit value) resulting from distributing the extra power acquired by subtracting the actual power consumption Wx from the first power limit value Wlim1 of some motor out of the individual motors to the first power limit value Wlim1 of the other motor.

Therefore, the control apparatus for the electric vehicle can suppress the torque limitation due to the power limitation, thereby outputting the torque according to the requested torque.

(4) The control apparatus for the electric vehicle further includes the torque limit value selection portion 205 configured to select the lower limit value of the maximum torque limit value Tlimmax preset to each of the motors and the first torque limit value Tlimw. The first torque instruction value calculation portion 204 calculates the first torque instruction value Tt1 of each of the motors that is equal to or smaller than the selected lower limit value and satisfies the distribution ratio St.

Therefore, the control apparatus for the electric vehicle can realize stable motor control by limiting the torque based on the power distribution in addition to limiting the torque based on the rating of the motor.

(5) The slip control portion 108 (a slip control torque calculation portion) calculates the slip control toque in consideration of the temperature protection of the plurality of motors.

Therefore, the control apparatus for the electric vehicle can achieve the temperature protection of the motors due to the torque reduction in addition to the slip control.

(6) The plurality of motors includes the front motor $1f$ configured to generate the torque on the front axle of the electric vehicle and the rear motor $1r$ configured to generate the torque on the rear axle of the electric vehicle.

Therefore, the control apparatus for the electric vehicle can realize stable running even when the distribution ratio St is changed by redistributing the torque to the front and rear wheels.

Second Embodiment

Figure 8:
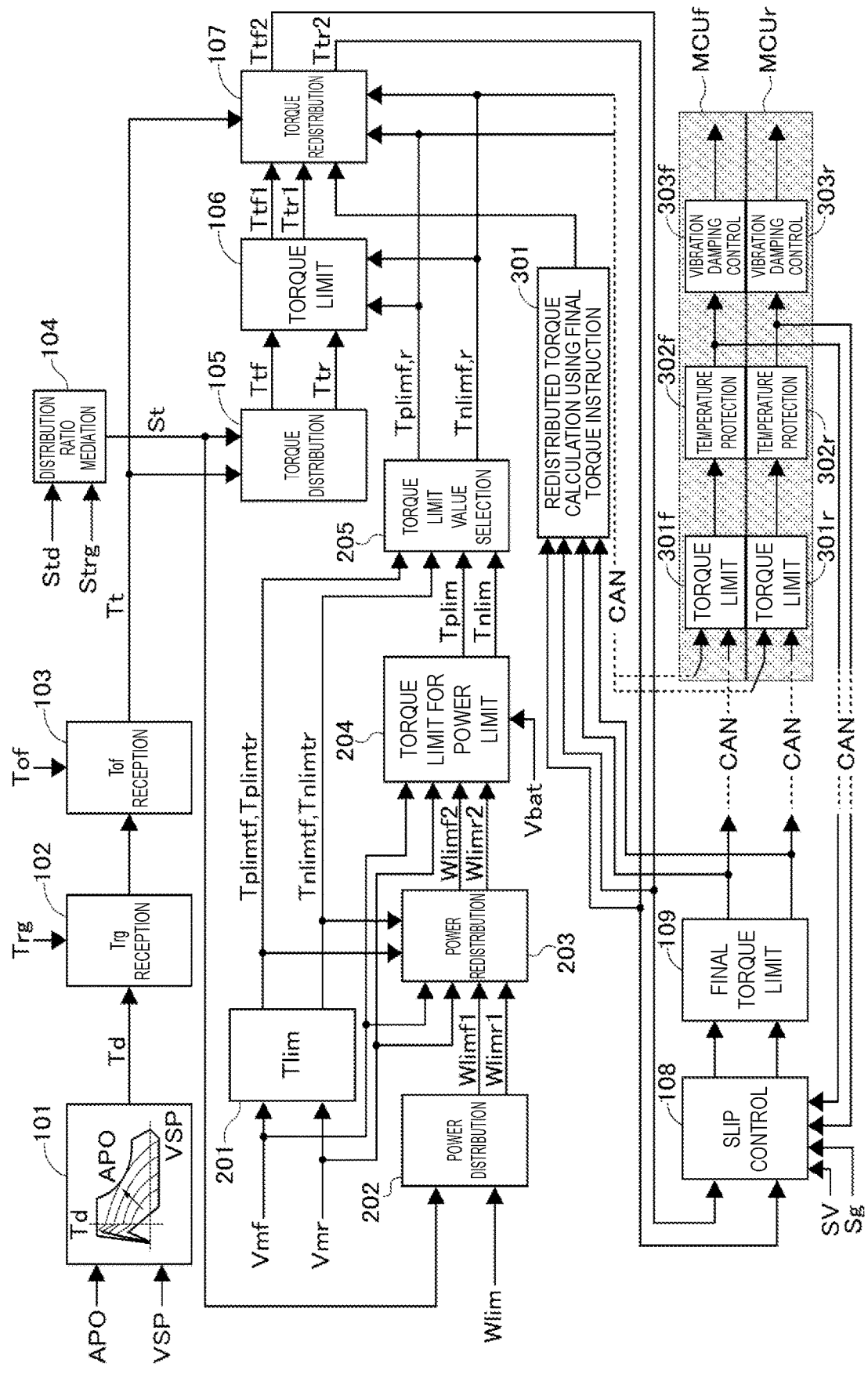
FIG. 8 is a control block diagram of an electric vehicle according to a second embodiment.

Next, a second embodiment will be described. The second embodiment has a basic configuration similar to the first embodiment, and therefore will be described focusing on only differences therefrom. FIG. 8 is a control block diagram of an electric vehicle according to the second embodiment. In the first embodiment, the final torque instruction value Tt3 output from the final torque limit portion 109 is output to each of the motor control units MCUf and MCUr. On the other hand, the second embodiment is different therefrom in terms of including a final torque instruction redistribution portion 301 that redistributes the final torque instruction value Tt3 again. The final torque instruction redistribution portion 301 calculates a fourth front motor torque instruction value Ttf4 and a fourth rear motor torque instruction value Ttr4 (hereinafter, these instruction values will be referred to as fourth torque instruction values Tt4) resulting from redistributing, within such a range that a sum of the final torque instruction values Tt3 of the individual motors does not exceed the requested torque Tt, the torque to a motor corresponding to the final torque instruction value Tt3 smaller than the torque limit value Tlim, when the sum of the final torque instruction values Tt3 of the individual motors falls below the requested torque Tt. Then, the torque redistribution portion 107 makes a calculation using the fourth torque instruction value Tt4 instead of the first torque instruction value Tt1, and outputs the updated second torque instruction value Tt2. As a result, when one of the motor torques is subjected to a limitation due to slip control or the like, the electric vehicle can redistribute the torque to the other motor, thereby effectively achieving the requested torque Td.

Having described embodiments for implementing the present invention based on the exemplary embodiments thereof, the specific configuration of the present invention is not limited to the configurations indicated in the exemplary embodiments, and the present invention also includes even a design modification and the like thereof made within a range that does not depart from the spirit of the present invention. Further, the individual components described in the claims and the specification can be arbitrarily combined or omitted within a range that allows them to remain capable of achieving at least a part of the above-described objects or producing at least a part of the above-described advantageous effects.

For example, in the embodiments, the electric vehicle has been described referring to the electric vehicle including the motor on the front wheel side and the motor on the rear wheel side by way of example, but may include individual motors for the left and right wheels without being limited to including the motors for the front and rear wheels. Further, the plurality of motors may be motors having the same performance as one another or may be motors having different performances from one another (differently rated motors). Further, in the first embodiment, the electric vehicle has been described referring to the configuration that supplies the power from the single battery module to the plurality of motors, but may be configured to supply the power from a plurality of battery modules to a plurality of batteries.

In the following description, other configurations recognizable from the above-described embodiments will be described.

A control apparatus for an electric vehicle, which includes a plurality of axles and a plurality of motors configured to receive supply of power from a power source and provide a torque to the plurality of axles, includes a first power limit value calculation portion configured to calculate a power limit value of each of the motors that is used when the power is supplied to the plurality of motors, based on a power limit value of the power source, and a first torque limit value calculation portion configured to calculate a first torque limit value, which is a torque limit value of each of the motors, based on the power limit value of each of the motors.

According to a further preferable configuration, the above-described configuration further includes a requested torque calculation portion configured to calculate a requested torque of the electric vehicle, a requested torque distribution ratio calculation portion configured to calculate a distribution ratio at which the requested torque is distributed to each of the axles, a first torque instruction value calculation portion configured to calculate a first torque instruction value of each of the motors that is equal to or smaller than the first torque limit value and satisfies the distribution ratio, and a second torque instruction value calculation portion configured to calculate a second torque instruction value resulting from redistributing, within a range that allows a sum of the first torque instruction values of the individual motors does not exceed the requested torque, the torque to a motor corresponding to the first torque instruction value lower than the first torque limit value, when the sum of the first torque instruction values of the individual motors is smaller than the requested torque.

According to another preferable configuration, any of the above-described configurations further includes a second power limit value calculation portion configured to calculate a second power limit value resulting from distributing extra power acquired by subtracting actual power consumption from the power limit value of one motor out of the individual motors to the power limit value of the other motor.

According to further another preferable configuration, any of the above-described configurations further includes a torque limit value selection portion configured to select a lower limit value of a maximum torque limit value preset to each of the motors and the first torque limit value. The first torque instruction value calculation portion calculates the first torque instruction value of each of the motors that is equal to or smaller than the selected lower limit value and satisfies the distribution ratio.

According to further another preferable configuration, any of the above-described configurations further includes a slip control torque calculation portion configured to calculate a slip control torque capable of eliminating or reducing a slip of a wheel based on a vehicle speed and a wheel speed, a final torque instruction value calculation portion configured to calculate a final torque instruction value resulting from limiting the second torque instruction value based on the slip control torque, and a third torque instruction value calculation portion configured to calculate a third torque instruction value resulting from redistributing, within a range that allows a sum of the final torque instruction values of the individual motors does not exceed the requested torque, the torque to a motor corresponding to the final torque instruction value lower than the first torque limit value and configured to generate the torque on a non-slip wheel, when the sum of the final torque instruction values of the individual motors is smaller than the requested torque.

According to further another preferable configuration, in any of the above-described configurations, the slip control torque calculation portion calculates the slip control toque in consideration of temperature protection of the plurality of motors.

According to further another preferable configuration, in any of the above-described configurations, the plurality of motors includes a front motor configured to generate the torque on a front axle of the electric vehicle and a rear motor configured to generate the torque on a rear axle of the electric vehicle.

Further, from another view point, a control method for an electric vehicle including a plurality of axles and a plurality of motors configured to receive supply of power from a power source and provide a torque to the plurality of axles includes calculating, as a first power limit value calculation, a power limit value of each of the motors that is used when the power is supplied to the plurality of motors, based on a power limit value of the power source, and calculating, as a first torque limit value calculation, a first torque limit value, which is a torque limit value of each of the motors, based on the power limit value of each of the motors.

Preferably, the above-described configuration further includes calculating, as a requested torque calculation, a requested torque of the electric vehicle, calculating, as a requested torque distribution ratio calculation, a distribution ratio at which the requested torque is distributed to each of the axles, calculating, as a first torque instruction value calculation, a first torque instruction value of each of the motors that is equal to or smaller than the first torque limit value and satisfies the distribution ratio, and calculating, as a second torque instruction value calculation, a second torque instruction value resulting from redistributing, within a range that allows a sum of the first torque instruction values of the individual motors does not exceed the requested torque, the torque to a motor corresponding to the first torque instruction value lower than the first torque limit value, when the sum of the first torque instruction values of the individual motors is smaller than the requested torque.

According to another preferable configuration, any of the above-described configurations further includes calculating, as a second power limit value calculation, a second power limit value resulting from distributing extra power acquired by subtracting actual power consumption from the power limit value of one motor out of the individual motors to the power limit value of the other motor.

According to further another preferable configuration, any of the above-described configurations further includes selecting, as a torque limit value selection, a lower limit value of a maximum torque limit value preset to each of the motors and the first torque limit value. The first torque instruction value calculation includes calculating the first torque instruction value of each of the motors that is equal to or smaller than the selected lower limit value and satisfies the distribution ratio.

Further, from another view point, a control system for an electric vehicle includes a power source, a plurality of motors configured to receive supply of power from the power source and provide a torque to a plurality of axles of the electric vehicle, and a control unit configured to control the power source and the plurality of motors. The control unit includes a first power limit value calculation portion configured to calculate a power limit value of each of the motors that is used when the power is supplied to the plurality of motors, based on a power limit value of the power source, and a first torque limit value calculation portion configured to calculate a first torque limit value, which is a torque limit value of each of the motors, based on the power limit value of each of the motors.

Preferably, in the above-described configuration, the control unit further includes a requested torque calculation portion configured to calculate a requested torque of the electric vehicle, a requested torque distribution ratio calculation portion configured to calculate a distribution ratio at which the requested torque is distributed to each of the axles, a first torque instruction value calculation portion configured to calculate a first torque instruction value of each of the motors that is equal to or smaller than the first torque limit value and satisfies the distribution ratio, and a second torque instruction value calculation portion configured to calculate a second torque instruction value resulting from redistributing, within a range that allows a sum of the first torque instruction values of the individual motors does not exceed the requested torque, the torque to a motor corresponding to the first torque instruction value lower than the first torque limit value, when the sum of the first torque instruction values of the individual motors is smaller than the requested torque.

According to further another preferable configuration, in any of the above-described configurations, the control unit further includes a second power limit value calculation portion configured to calculate a second power limit value resulting from distributing extra power acquired by subtracting actual power consumption from the power limit value of one motor out of the individual motors to the power limit value of the other motor.

The present application claims priority to Japanese Patent Application No. 2016-181333 filed on Sep. 16, 2016. The entire disclosure of Japanese Patent Application No. 2016-181333 filed on Sep. 16, 2016 including the specification, the claims, the drawings, and the abstract is incorporated herein by reference in its entirety.

REFERENCE SIGN LIST

FL, FR front wheel
RL, RR rear wheel
1$f$ front motor
1$r$ rear motor
2$f$, 2$r$ speed reduction mechanism
3$f$, 3$r$ differential gear
4$f$, 4$r$ drive shaft
5$f$, 5$r$ inverter
7 accelerator position sensor
8$f$, 8$r$ resolver
9 brake controller
10 wheel speed sensor
11 CAN communication line (communication device)
12 longitudinal acceleration sensor
CU vehicle control unit
BCU battery control unit
MCUf, MCUr motor control unit

The invention claimed is:

1. A control apparatus for an electric vehicle including a plurality of axles and motors configured to receive supply of power from a power source and provide a torque to the plurality of axles, the control apparatus comprising:
   a first power limit value calculation portion configured to calculate a power limit value of each of the motors that is used when the power is supplied to the motors, based on a power limit value of the power source;
   a first torque limit value calculation portion configured to calculate a first torque limit value, which is a torque limit value of each of the motors, based on the power limit value of each of the motors;
   a requested torque calculation portion configured to calculate a requested torque or the electric vehicle;
   a requested torque distribution ratio calculation portion configured to calculate a distribution ratio at which the requested torque is distributed to each of the plurality of axles;
   a first torque instruction value calculation portion configured to calculate a first torque instruction value of each of the motors that is equal to or smaller than the first torque limit value and is within the distribution ratio;
   a second torque instruction value calculation portion configured to calculate a second torque instruction value, within a range of values that allow a sum of the first torque instruction values of individual motors not to exceed the requested torque, the second torque instruction value being a redistributed torque applied to a motor and having a value that corresponds to the first torque instruction value and being lower than the first torque limit value, when the sum of the first torque instruction values of the individual motors is smaller than the requested torque, and
      a second power limit value calculation portion configured to calculate a second power limit value resulting from distributing extra power acquired by subtracting actual power consumption from the power limit value of one motor out of the individual motors to the power limit value of the other motor.

2. The control apparatus for the electric vehicle according to claim 1, further comprising a torque limit value selection portion configured to select a lower limit value of a maximum torque limit value preset to each of the motors and the first torque limit value,
   wherein the first torque instruction value calculation portion calculates the first torque instruction value of each of the motors that is equal to or smaller than the selected lower limit value and is within the distribution ratio.

3. The control apparatus for the electric vehicle according to claim 1, further comprising:
   a slip control torque calculation portion configured to calculate a slip control torque capable of eliminating or reducing a slip of a wheel, based on a vehicle speed and a wheel speed;
   a final torque instruction value calculation portion configured to calculate a final torque instruction value resulting from limiting the second torque instruction value based on the slip control torque; and
   a third torque instruction value calculation portion configured to calculate a third torque instruction value, from within a range of values that allow a sum of the final torque instruction values of the individual motors not to exceed the requested torque, the third torque instruction value being a redistributed torque applied to a motor and having a value that corresponds to the final torque instruction value and being lower than the first torque limit value, the third torque instruction value also being configured to generate the torque on a non-slip wheel, when the sum of the final torque instruction values of the individual motors is smaller than the requested torque.

4. The control apparatus for the electric vehicle according to claim 3, wherein the slip control torque calculation portion calculates the slip control toque in consideration of temperature protection of the motors.

5. The control apparatus for the electric vehicle according to claim 1, wherein the motors includes a front motor configured to generate the torque on a front axle of the electric vehicle and a rear motor configured to generate the torque on a rear axle of the electric vehicle.

6. A control method for an electric vehicle including a plurality of axles and motors configured to receive supply of power from a power source and provide a torque to the plurality of axles, the control method comprising:
   calculating, as a first power limit value calculation, a power limit value of each of the motors that is used when the power is supplied to the motors, based on a power limit value of the power source; and
   calculating, as a first torque limit value calculation, a first torque limit value, which is a torque limit value of each of the motors, based on the power limit value of each of the motors;
   calculating, as a requested torque calculation, a requested torque of the electric vehicle;
   calculating, as a requested torque distribution ratio calculation, a distribution ratio at which the requested torque is distributed to each of the plurality of axles;
   calculating, as a first torque instruction value calculation, a first torque instruction value of each of the motors that is equal to or smaller than the first torque limit value and is within the distribution ratio,
   calculating, as a second torque instruction value calculation, a second torque instruction value, within a range of values that allow a sum of the first torque instruction values of individual motors not to exceed the requested torque, the second torque instruction value being a redistributed torque applied to a motor and having a value that corresponds to the first torque instruction value and being lower than the first torque limit value, when the sum of the first torque instruction values of the individual motors is smaller than the requested torque; and
   calculating, as a second power limit value calculation, a second lower limit value resulting from distributing extra power acquired by subtracting actual power consumption from the power limit value of one motor out of the individual motors to the power limit value of the other motor.

7. The control method for the electric vehicle according to claim 6, further comprising selecting, as a torque limit value selection, a lower limit value of a maximum torque limit value preset to each of the motors and the first torque limit value,
   wherein the first torque instruction value calculation includes calculating the first torque instruction value of each of the motors that is equal to or smaller than the selected lower limit value and is within the distribution ratio.

8. The control method for the electric vehicle according to claim 6, further comprising:

calculating, as a slip control torque calculation, a slip control torque capable of eliminating or reducing a slip of a wheel, based on a vehicle speed and a wheel speed;

calculating, as a final torque instruction value calculation, a final torque instruction value resulting from limiting the second torque instruction value based on the slip control torque; and calculating, as a third torque instruction value calculation, a third torque instruction value, within a range of values that allows a sum of the final torque instruction values of the individual motors not to exceed the requested torque, the third torque instruction value being a redistributed torque applied to a motor having value that corresponds to the final torque instruction value and being lower than the first torque limit value, and the third torque instruction value also being configured to generate the torque on a non-slip wheel, when the sum of the final torque instruction values of the individual motors is smaller than the requested torque.

9. The control method for the electric vehicle according to claim 8, wherein the slip control torque calculation includes calculating the slip control toque in consideration of temperature protection of the motors.

10. The control method for the electric vehicle according to claim 6, wherein the motors includes a front motor configured to generate the torque on a front axle of the electric vehicle and a rear motor configured to generate the torque on a rear axle of the electric vehicle.

11. A control system for an electric vehicle, the control system comprising:
- a power source;
- motors configured to receive supply of power from the power source and provide a torque to a plurality of axles of the electric vehicle; and
- a control unit configured to control the power source and the motors,
- wherein the control unit includes
  - a first power limit value calculation portion configured to calculate a power limit value of each of the motors that is used when the power is supplied to the motors, based on a power limit value of the power source;
  - a first torque limit value calculation portion configured to calculate a first torque limit value, which is a torque limit value of each of the motors, based on the power limit value of each of the motors,
  - a requested torque calculation portion configured to calculate a requested torque of the electric vehicle;
  - a requested torque distribution ratio calculation portion configured to calculate a distribution ratio at which the requested torque is distributed to each of the plurality of axles;
  - a first torque instruction value calculation portion configured to calculate a first torque instruction value of each of the motors that is equal to or smaller than the first torque limit value and is within the distribution ratio;
  - a second torque instruction value calculation portion configured to calculate a second torque instruction value, within a range of values that allow a sum of the first torque instruction values of individual motors not to exceed the requested torque, the second torque instruction value being a redistributed torque applied to a motor having a value that corresponds to the first torque instruction value and being lower than the first torque limit value, when the sum of the first torque instruction values of the individual motors is smaller than the requested torque, and
  - a second power limit value calculation portion configured to calculate a second power limit value resulting from distributing extra power acquired by subtracting actual power consumption from the power limit value of one motor out of the individual motors to the power limit value of the other motor.

12. The control system for the electric vehicle according to claim 11, further comprising a torque limit value selection portion configured to select a lower limit value of a maximum torque limit value preset to each of the motors and the first torque limit value,
wherein the first torque instruction value calculation portion calculates the first torque instruction value of each of the motors that is equal to or smaller than the selected lower limit value and is within the distribution ratio.

13. The control system for the electric vehicle according to claim 11, further comprising:
- a slip control torque calculation portion configured to calculate a slip control torque capable of eliminating or reducing a slip of a wheel, based on a vehicle speed and a wheel speed;
- a final torque instruction value calculation portion configured to calculate a final torque instruction value resulting from limiting the second torque instruction value based on the slip control torque; and
- a third torque instruction value calculation portion configured to calculate a third torque instruction value, within a range of values that allow a sum of the final torque instruction values of the individual motors not to exceed the requested torque, the third torque instruction value being a redistributed torque applied to a motor having a value that corresponds to the final torque instruction value and being lower than the first torque limit value, the third torque instruction value also being configured to generate the torque on a non-slip wheel, when the sum of the final torque instruction values of the individual motors is smaller than the requested torque.

14. The control system for the electric vehicle according to claim 13, wherein the slip control torque calculation portion calculates the slip control toque in consideration of temperature protection of the motors.

15. The control system for the electric vehicle according to claim 11, wherein the motors includes a front motor configured to generate the torque on a front axle of the electric vehicle and a rear motor configured to generate the torque on a rear axle of the electric vehicle.

\* \* \* \* \*